United States Patent
Schulz

(10) Patent No.: US 7,123,921 B1
(45) Date of Patent: Oct. 17, 2006

(54) METHOD FOR CONTROLLING THE DISTRIBUTION OF TRANSMISSION RATES IN A CELLULAR RADIO TELECOMMUNICATIONS SYSTEM

(75) Inventor: Egon Schulz, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/914,413

(22) PCT Filed: Feb. 25, 2000

(86) PCT No.: PCT/DE00/00538

§ 371 (c)(1),
(2), (4) Date: Aug. 27, 2001

(87) PCT Pub. No.: WO00/51377

PCT Pub. Date: Aug. 31, 2000

(30) Foreign Application Priority Data

Feb. 26, 1999 (DE) .............................. 199 08 424

(51) Int. Cl.
H04Q 7/20 (2006.01)

(52) U.S. Cl. .................................................... 455/452

(58) Field of Classification Search ................. 455/452
See application file for complete search history.

(56) References Cited

U.S. PATENT DOCUMENTS 4,748,681 A   5/1988   Schmidt
5,613,213 A   3/1997   Naddell et al.

FOREIGN PATENT DOCUMENTS

| DE | 196 25 142 A1 | 10/1997 |
| DE | 197 13 164 A1 | 11/1997 |
| EP | 0 209 383 B1 | 1/1987 |
| WO | WO 00/27051 | 5/2000 |

Primary Examiner—William D. Cumming
(74) Attorney, Agent, or Firm—Bell, Boyd & Lloyd LLC

(57) ABSTRACT

A method for controlling the distribution of transmission rates in a cellular radiotelecommunication system wherein, in order to support the effective utilization of types of time slot in wireless telecommunication systems, e.g. the DECT-specific "Full" or "Double Slots", two fixed parts are provided for each radio cell. The first fixed parts in each case support two types of time slot but signal in dependence on the capacity utilization of the second fixed parts, which only support one type of time slot, that they support the second or the first and second type of time slot. The portable parts store the fixed parts, after they have signaled their support of types of time slot, in separate lists.

23 Claims, 2 Drawing Sheets

METHOD FOR CONTROLLING THE DISTRIBUTION OF TRANSMISSION RATES IN A CELLULAR RADIO TELECOMMUNICATIONS SYSTEM

BACKGROUND OF THE INVENTION

In the field of telecommunication close to the terminal, radio links are increasingly gaining in importance. Cordless telephones, mobile radio terminals and the wireless "RLL" (Radio in the Local Loop) or "WLL" (Wireless Local Loop) line interfacing systems are known examples of this. An air interface known as "DECT" (Digital Enhanced (previously European) Cordless Telephone) was defined on the initiative of European companies, with the aim of specifying a standard for a universal high-performance air interface. The DECT standard is described in the documents ETS (European Telecommunication Standard) 300 175-1, . . . , 9 Oct. 1992 of the ETSI (European Telecommunication Standards Institute) and is known from these.

A DECT system allows a maximum of 120 simultaneous connections between so-called fixed parts and portable parts by which, incidentally, is meant not only mobile terminals but, as for example in the case of the wireless line interface system "Radio in the Local Loop", also stationary system components communicating with a fixed part via air interface, which include the functionality of a portable part. In which system a maximum of 10 frequencies between 1.88 and 1.90 GHz are available and a maximum of 12 simultaneous duplex voice links (time slots, voice channels) can be implemented for each frequency.

The DECT standard also specifies interworking between DECT and "ISDN" (Integrated Services Digital Network). For this reason, time slots with a 64 kbit/s transmission rate, intended as support for ISDN, are also specified in addition to the time slots (channels) with 32 kbit/s ("Full Slots") and 8 kbit/s ("Half Slots") required for voice links.

Fixed parts and corresponding portable parts are generally known which support transmission rates of both 32 kbit/s "Full Slots" and 64 kbit/s "Double Slots" for the faster data transmission of, for example, 64 kbit/s or, respectively, for supporting DECT/ISDN interworking, which thus provide up to six channels with a transmission rate of 64 kbit/s; i.e., a maximum of two complete ISDN connections consisting of two "B channel" basic channels with 64 kbit/s each and one "D channel" control channel with 16 kbit/s.

These fixed parts are integrated into preexisting cordless telecommunication, RLL or WLL systems. Where there is a requirement for high transmission rates, particularly for packet data transmission, this integration is done by substituting fixed parts which support both 32 kbit/s time slots (full slots) and 64 kbit/s time slots (double slots) for the fixed parts which only provide time slots of 32 kbit/s. A problem arising with this procedure is the fact that fully functional fixed parts are removed from existing networks or radio-telecommunication systems even though their procurement costs have not yet been amortized in some cases.

After the substitution, the availability of full-slot connections and double-slot connections is guaranteed, in principle. However, if there is a large number of existing full-slot connections, the case may occur that requested double-slot connections cannot be implemented since, due to the existing full-slot connections, it is not possible to form time slots with 64 kbit/s transmission rate (double slot). In this case, channels for services having a requirement for high transmission rates, especially the transmission of packet data, can only be provided again when the number of existing full-slot connections has been reduced.

From U.S. Pat. No. 4,748,681, a telecommunication system is known in which a fixed part is, in each case, operated in a radio cell. The radio cells in each case exhibit a multiplicity of different portable parts which need different services and the fixed part at least partially supports these different services and informs the portable parts via signaling of the services supported.

The present invention is directed toward specifying a method for controlling the distribution of transmission rates in a cellular radiotelecommunication system in which the radio transmission resources available in the radiotelecommunication system, especially with an RLL or WLL system, respectively, are effectively used.

SUMMARY OF THE INVENTION

Accordingly, in the method according to the present invention, a second fixed part which supports the first transmission rate is, in each case, additionally installed in the radio cell in a cellular telecommunication system having at least one radio cell with a first fixed part which supports a first low transmission rate and a second transmission rate and at least one portable part for purposes of cordless telecommunication, especially in accordance with the TDMA principle. The second fixed part signals the support of the first transmission rate in a first system information item and the first fixed part signals the support of the second or of the first and second transmission rate depending on traffic.

The essential advantage of the method according to the present invention is the possibility of using the second fixed part exclusively for implementing connections having a low transmission rate and the first fixed part predominantly for implementing connections having a high transmission rate so that adequate supply with time slots of high transmission rate is guaranteed within the radio cell.

In a further embodiment, two lists are maintained in a portable part which supports both the first transmission rate for providing the first service and a second transmission rate for providing the second service. If it is signaled to a portable part in the system information item of a fixed part that the latter supports the first transmission mode, connection-related data, especially the identification of the fixed part, obtained from the system information are stored in a first list. If the fixed part signals to the portable part that it supports the second transmission mode, the connection-related data, especially the identification of the fixed part, are stored in a second list.

An advantage of this further embodiment is that the fixed parts are differentiated in accordance with the services provided in order to guarantee better utilization of the available services.

An essential advantage of further embodiments relating to both decentralized traffic-dependent control and centralized traffic-dependent control is the efficient utilization of the available services since the fixed part which supports services with high transmission rates is kept free of services with low transmission rates via suitable signaling.

An essential advantage of another embodiment is to keep the first fixed part free for telecommunication connections utilizing the second service by exchanging the telecommunication connection between the first fixed part and the portable part utilizing the first service against an equivalent telecommunication connection to the second fixed part.

An advantage of a further embodiment is time stabilization of the method since the hysteresis achieved via the threshold values prevents the system information from continuously flipping.

Another embodiment allows for the resultant possibility of use in a DECT system.

Yet another embodiments for the resultant possibility of use in a GSM system.

In another embodiment, the simple and inexpensive implementation of the method is effected since the exchange of telecommunication connections is performed without additional measurements and signaling operations.

An advantage of a further embodiment is an increase in the effective utilization of available services since the first fixed part is rapidly freed for telecommunication connections utilizing the second service with the second transmission rate, due to the rapid exchange of the telecommunication connections.

Additional features and advantages of the present invention are described in, and will be apparent from, the following Detailed Description of the Invention and the Figures.

DETAILED DESCRIPTION OF THE INVENTION

Figure 1:
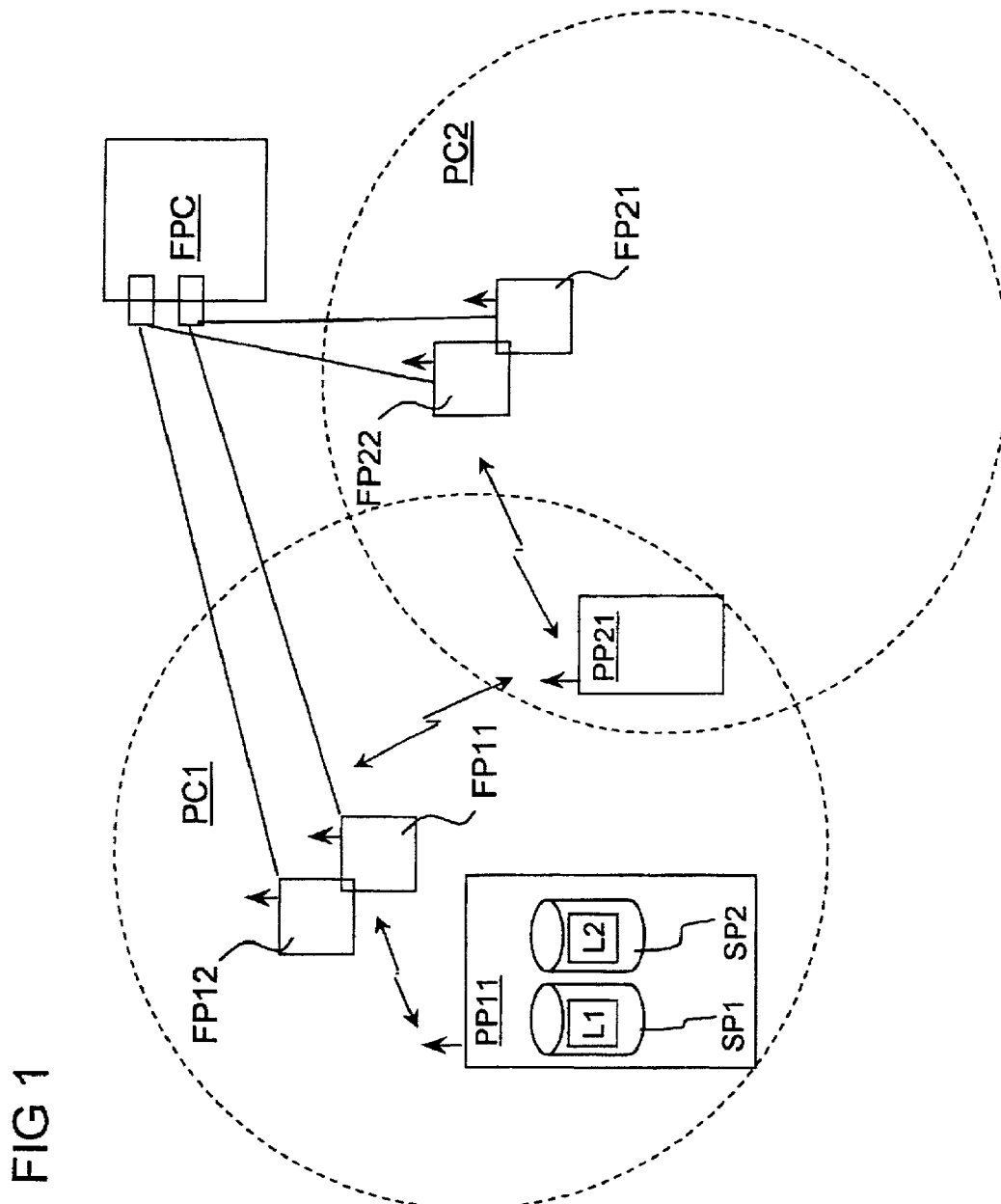
FIG. 1 shows two radio cells of a DECT system with, in each case, one portable part and two fixed parts and a higher-level controller.

FIG. 1 shows a telecommunication system constructed as a DECT system, with radio cells PC1 and PC2 constructed as picocells. Information is transmitted in each case via a DECT air interface designed in accordance with the DECT standard, via which the wireless "DECT radio channel" transmission medium is accessed by a combination of FDMA (Frequency Division Multiple Access), TDMA (Time Division Multiple Access) and TDD (Time Division Duplex) access methods. In this system, ten carrier frequencies with a channel spacing of, in each case, 1.728 MHz (FDMA) are available in the frequency range between 1880 MHz and 1900 MHz, the time frame established per carrier being divided into 24 time slots or channels (also called "slots" (TDMA)).

During the transmission of voice data, DECT fixed parts FP11, FP12, FP21, FP22 use time slots with 32 kbit/s transmission rate (full slots), whereas time slots having a transmission rate of 64 kbit/s (double slots) are mainly used for the transmission of packet data by first DECT fixed parts FP11, FP21. A first DECT portable part PP21 uses full slots for transmitting voice data, whereas a second DECT portable part PP11 uses full slots for voice transmission and double slots for the transmission of packet data. The second DECT portable part PP11 stores data records from the DECT fixed parts FP11, FP12, FP21, FP22 which use full slots and the DECT fixed parts FP11, FP12, FP21, FP22 which use double slots, in the form of separate lists L1, L2 in a memory SP1, SP2. A controller FPC, which is connected to the DECT fixed parts FP11, FP12, FP21, FP22 via a line in order to control them in dependence on the traffic, is superordinate to the radio cells PC1 and PC2.

As an alternative, the connection between DECT fixed parts FP11, FP12, FP21, FP22 and the controller FPC also can be implemented via the DECT air interface.

The DECT system also can be implemented without controller; i.e., the traffic-dependent control is implemented by the fixed parts FP11, FP12, FP21, FP22.

Figure 2:
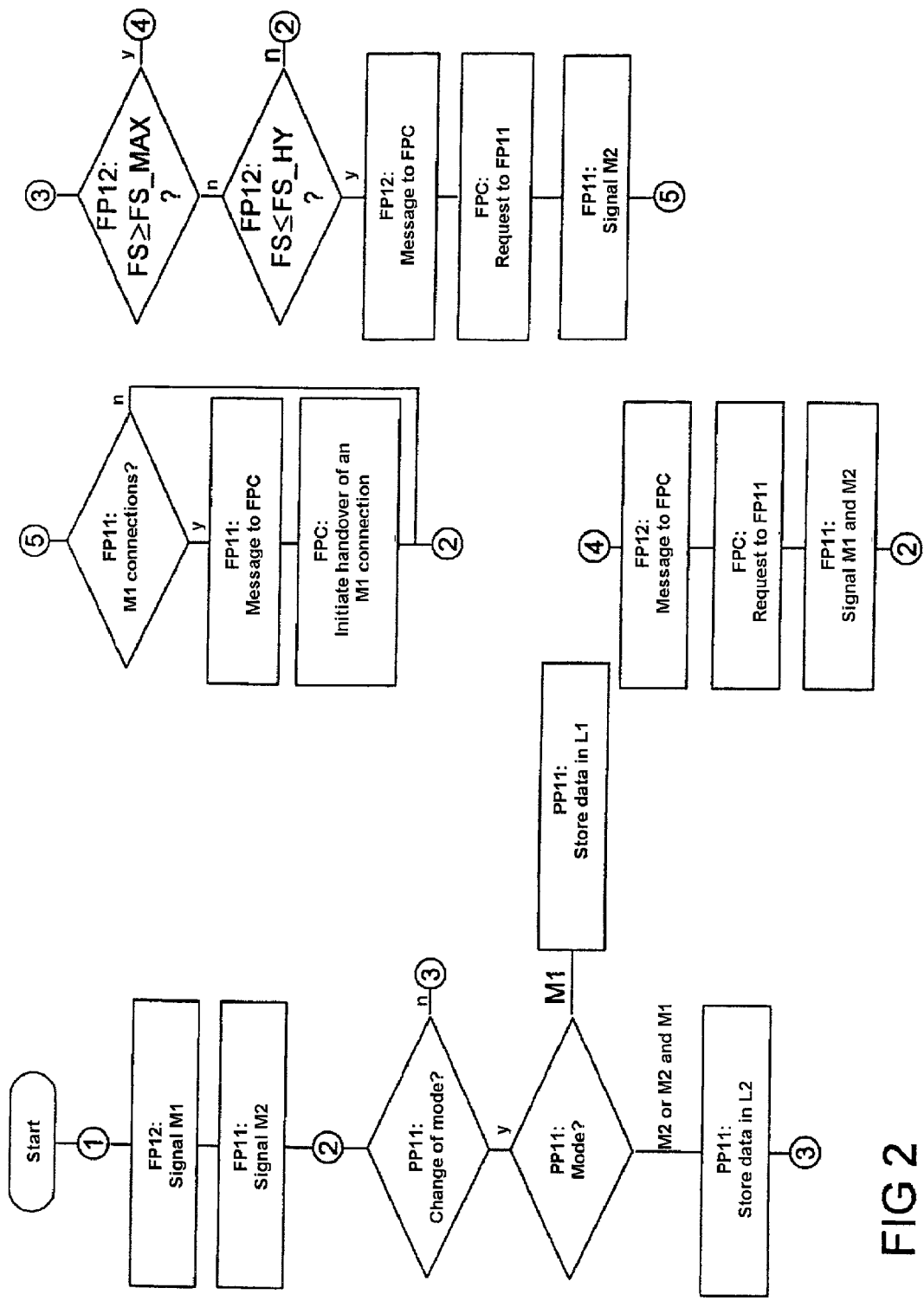
FIG. 2 shows a flowchart for controlling the traffic-dependent distribution of the transmission rates in fixed parts in the DECT system according to FIG. 1.

The flowchart shown in FIG. 2 illustrates the sequence of traffic-dependent control which takes place in the DECT system according to FIG. 1 between a first DECT fixed part FP11, a second DECT fixed part FP12, the higher-level controller FPC and the DECT portable part PP11 within the picocell PC1 in dependence on a value FS of the traffic load which has been detected by the second DECT fixed part FP12.

In the initial state, the second fixed part FP12 signals to the second portable part PP11 in a second system information item that it supports full slots and the first fixed part FP11 signals to the second DECT portable part PP11 in a first system information item that it supports double slots. Signaling is carried out in each case, for example, by setting and resetting flags.

If the second DECT portable part PP11 finds from the flag set or, respectively, reset in the first system information item that the first DECT fixed part FP11 supports a transmission mode M2 (i.e., use of double slots for transmitting, for example, packet data), the second DECT portable part PP11 stores connection-related data from this system information item, for example, among other things, the identification of the DECT fixed part FP11, in the form of a first list L1. If the second DECT fixed part FP12 signals to the second DECT portable part PP11 in the second system information item that it supports a transmission mode M1, i.e. full slots, for transmitting voice, the second DECT portable part PP11 stores connection-related data from this system information item, for example, among other things, the identification of the DECT fixed part, in the form of a second list L2. The lists L1, L2 are updated by a change in the system information items.

If the number FS of the full slots used by the second DECT fixed part FP12 is greater than or equal to a first threshold value FS_MAX which, together with a second threshold value FS_HY, is determined, e.g. centrally in an information and operation center, or locally in the relevant DECT fixed parts FP11, FP21, the second DECT fixed part FP12 sends a first signaling information item to the controller FPC. The first DECT fixed part FP11 is thereupon controlled by the higher-level controller FPC in such a manner that it signals in the first system information item directed to the second DECT portable part PP11 located in the radio cell PC1 that it supports both full slots and double slots. After having received this system information item, the second DECT portable part PP11 updates its list(s) L1, L2.

If the number FS is smaller than the first threshold value FS_MAX, the second DECT fixed part FP12 checks whether the number FS is less than the second threshold value FS_HY. If this is so, the second DECT fixed part FP12 sends a second signaling information item to the higher-level controller FPC. The first DECT fixed part FP11 is thereupon controlled by the higher-level controller FPC in such a manner that it signals the support of double slots to the second portable part PP11. After having received this system information item, the second DECT portable part PP11 updates the lists L1, L2, if necessary. In addition, the controller FPC requests the first DECT fixed part FP11 to determine the number of existing full-slot connections (transmission mode M1) between the first DECT fixed part FP11 and the DECT portable parts PP11, PP21 and, if these exist, to report them. If there is at least one full-slot connection, the controller FPC can initiate the handover of a full-slot connection from the first DECT fixed part FP11 to the second DECT fixed part FP12 via the second DECT portable part PP11.

If the number is not less than the second threshold value FS_HY or if there is no full-slot connection between the first DECT fixed part FP11 and the second DECT portable part PP11, only the lists L1, L2 of the second DECT portable part are updated, as necessary, and the process recommences with the current number FS.

As an alternative to centralized control by the controller FPC, the traffic-dependent control also can be performed by the DECT fixed parts FP11, FP12, FP21, FP22 as already described with FIG. 1. In this case, the second DECT fixed parts FP12, FP22 determine the current value of the number FS, perform the threshold value comparisons and signal the results to the first DECT fixed parts FP11, FP21. The first DECT fixed parts FP11, FP21 signal the corresponding transmission modes to the DECT portable parts PP11, PP21 and, if necessary, initiate a handover.

As an alternative to the iterative handover procedure of only one full-slot connection, a number of full-slot connections can be handed over in one step. The number of connections is limited, however, to such an extent that the first threshold value FS_MAX is not reached or exceeded by the handover.

Although the present invention has been described with reference to specific embodiments, those of skill in the art will recognize that changes may be made thereto without departing from the spirit and scope of the invention as set forth in the hereafter appended claims.

The invention claimed is:

1. A method for controlling a distribution of transmission rates in a cellular radiotelecommunication system, the method comprising the steps of:
   operating, in a radio cell of the radiotelecommunication system, at least two fixed parts and at least one portable part for purposes of wireless telecommunication;
   supporting, via a first of the at least two fixed parts, both a first transmission mode in which a first service is transmitted at a first transmission rate and a second transmission mode in which a second service is transmitted at a second transmission rate;
   supporting, via a second of the at least two fixed parts, the first transmission mode in which the first service is transmitted at the first transmission rate;
   signaling to the at least one portable part, via the first fixed part in a first system information item that the first fixed part supports either the first transmission mode and the second transmission mode, or that the first fixed part supports the second transmission mode but not the first transmission mode, depending on a traffic load carried by the second fixed part; and
   signaling to the at least one portable part, via the second fixed part, in a second system information item that the second fixed part supports the first transmission mode.

2. A method for controlling a distribution of transmission rates in a cellular radiotelecommunication system as claimed in claim 1, the method further comprising the steps of:
   supporting, via the at least one portable part, both the first transmission mode in which the first service is transmitted at the first transmission rate, and the second transmission mode in which the second service is transmitted at the second transmission rate;
   storing connection-related data in at least one memory via the at least one portable part;
   storing primary data records in the form of a first list in the memory, via the at least one portable part, when the fixed parts signal in the system information items that the fixed parts support the first transmission mode;
   storing secondary data records in the form of a second list in the memory, via the at least one portable part, when the fixed parts signal in the system information items that the fixed parts support the second transmission mode; and
   updating both the first list and the second list, via the at least one portable part, in case of a change in system information from the fixed parts.

3. A method for controlling a distribution of transmission rates in a cellular radiotelecommunication system as claimed in claim 1, the method further comprising the steps of:
   comparing a value of a current capacity utilization with threshold values via the second fixed part;
   sending to the first fixed part, via the second fixed part, a first signaling information item when the value of the current capacity utilization is greater than or equal to a first threshold value;
   sending to the first fixed part, via the second part, a second signaling information item when the value of the current capacity utilization is less than or equal to a second threshold value;
   signaling, via the first fixed part, between receiving the first and the second signaling information items, to the at least one portable part in the first system information item that the first fixed part supports both the first transmission mode and the second transmission mode; and
   signaling, via the first fixed part, between receiving the second and the first signaling information items, to the at least one portable part in the first system information item that the first fixed part supports the second transmission mode and, possibly, the first transmission mode.

4. A method for controlling a distribution of transmission rates in a cellular radiotelecommunication system as claimed in claim 1, the method further comprising the steps of:
   comparing a value of a current capacity utilization with threshold values via the second fixed part;
   sending to a higher-level controller, via the second fixed part, a first signaling information item when the value of the current capacity utilization is greater to or equal to a first threshold value;
   sending to the higher-level controller, via the second fixed part, a second signaling information item when the value of the current capacity utilization is less than or equal to a second threshold value;
   controlling the first fixed part, via the higher-level controller, between receiving the first and the second signaling information items, such that the first fixed part signals to the at least one portable part in the first system information item that the first fixed part supports the first transmission mode and the second transmission mode;
   controlling the first fixed part, via the higher-level controller, between receiving the second and the first signaling information items, such that the first fixed part signals to the at least one portable part in the first system information item that the first fixed part supports the second transmission mode and, possibly, the first transmission mode.

5. A method for controlling a distribution of transmission rates in a cellular radiotelecommunication system as claimed in claim 3, the method further comprising the step of:

exchanging telecommunication connections between the at least one portable part and the first fixed part, in which the first transmission mode is used, via a handover by corresponding telecommunication connections between the at least one portable part and the second fixed part.

6. A method for controlling a distribution of transmission rates in a cellular radiotelecommunicaton system as claimed in claim 5, wherein the telecommunication connections are exchanged when the second signaling information item is received, the telecommunication connections are exchanged automatically, and the exchange of telecommunication connections is ended, at the latest, after the first signaling information item has been received.

7. A method for controlling a distribution of transmission rates in a cellular radio telecommunication system as claimed in claim 6, wherein the at least one portable part initiates the exchange of, and exchanges, the telecommunication connections.

8. A method for controlling a distribution of transmission rates in a cellular radiotelecommunication system as claimed in claim 6, wherein the fixed parts initiate the exchange of, and exchange, the telecommunication connections.

9. A method for controlling a distribution of transmission rates in a cellular radiotelecommunication system as claimed in claim 4, the method further comprising the step of:

exchanging telecommunication connections between the at least one portable part and the first fixed part, in which the first transmission mode is used, via a handover by corresponding telecommunication connections between the at least one portable part and the second fixed part.

10. A method for controlling a distribution of transmission rates in a cellular radiotelecommunication system as claimed in claim 9, wherein the telecommunication connections are exchanged when the second signaling information item is received, the telecommunication connections are exchanged automatically, and the exchange of telecommunication connections is ended, at the latest, after the first signaling information item has been received.

11. A method for controlling a distribution of transmission rates in a cellular radiotelecommunication system as claimed in claim 10, wherein the higher-level controller initiates the exchange of, and exchanges, at the telecommunication connections.

12. A method for controlling a distribution of transmission rates in a cellular radiotelecommunication system as claimed in claim 5, wherein the telecommunication connections are exchanged in an iterative process.

13. A method for controlling a distribution of transmission rates in a cellular radiotelecommunicaton system as claimed in claim 5, the method further comprising the steps of:

signaling to the first fixed part a particular number of connections which can be handed over to the second fixed part without exceeding the first threshold value; and handing over, in one step, from the first fixed part to the second fixed part, the particular number of connections.

14. A method for controlling a distribution of transmission rates in a cellular radiotelecommunication system as claimed in claim 12, the method further comprising the step of:

signaling, from the second fixed part to the first fixed part, a number of connections exchanged.

15. A method for controlling a distribution of transmission rates in a cellular radiotelecommunication system as claimed in claim 9, wherein the telecommunication connections are exchanged in an iterative process.

16. A method for controlling a distribution of transmission rates in a cellular radiotelecommunication system as claimed in claim 15, the method further comprising the steps of:

signaling the number of connections to the higher-level controller via the second fixed part; and signaling the number of connections to the first fixed part via the higher-level controller.

17. A method for controlling a distribution of transmission rates in a cellular radiotelecommunication system as claimed in claim 3, wherein an absolute value of the second threshold value is equal to an absolute value of the first threshold value.

18. A method for controlling a distribution of transmission rates in a cellular radiotelecommunication system as claimed in claim 3, wherein an absolute value of the second threshold value is smaller than an absolute value of the first threshold value.

19. A method for controlling a distribution of transmission rates in a cellular radiotelecommunication system as claimed in claim 1, wherein signals are transmitted at 32 kbit/s per second via the first transmission rate and at 64 kbit/s per second via the second transmission rate.

20. A method for controlling a distribution of transmission rates in a cellular radiotelecommunication system as claimed in claim 1, wherein voice is transmitted via the first service and packet data is transmitted via the second service.

21. A method for controlling a distribution of transmission rates in a cellular radiotelecommunication system as claimed in claim 1, wherein the at least one portable part is a wireless portable part.

22. A method for controlling a distribution of transmission rates in a cellular radiotelecommunication system as claimed in claim 1, wherein the at least one portable part is a wireless radio network termination.

23. A method for controlling a distribution of transmission rates in a cellular radiotelecommunication system as claimed in claim 1, wherein the radiotelecommunication system operates in accordance with a Digital Enhanced Cordless Telephone standard.

* * * * *